United States Patent [19]

Agusa et al.

[11] Patent Number: 5,247,859
[45] Date of Patent: Sep. 28, 1993

[54] SHIFT CONTROL SYSTEM FOR AUTOMATIC TRANSMISSION

[75] Inventors: Keisuke Agusa; Takahiro Kyohzuka, both of Hiroshima, Japan

[73] Assignee: Mazda Motor Corporation, Hiroshima, Japan

[21] Appl. No.: 577,738

[22] Filed: Sep. 5, 1990

[30] Foreign Application Priority Data

Sep. 6, 1989 [JP] Japan .................. 1-231020
Feb. 8, 1990 [JP] Japan .................. 2-29107

[51] Int. Cl.$^5$ ............................ B60K 41/06
[52] U.S. Cl. ........................ 74/866; 74/861; 74/878; 364/424.1
[58] Field of Search ............ 74/866, 861, 878; 364/424.1

[56] References Cited

U.S. PATENT DOCUMENTS

| | | | |
|---|---|---|---|
| 4,380,048 | 4/1983 | Kishi et al. | 364/424.1 |
| 4,501,171 | 2/1985 | Müller et al. | 74/877 X |
| 4,523,281 | 6/1985 | Noda et al. | 74/866 X |
| 4,584,906 | 4/1986 | Nagaoka et al. | 364/424.1 X |
| 4,669,335 | 6/1987 | Matsuoka et al. | 74/866 |
| 4,732,055 | 3/1988 | Tateno et al. | 364/424.1 X |
| 4,789,936 | 12/1988 | Kurihara et al. | 364/424.1 |
| 4,793,217 | 12/1988 | Morisawa et al. | 74/866 |
| 4,807,497 | 2/1989 | Yasue et al. | 74/866 X |
| 4,875,892 | 10/1989 | Sueda | 74/865 X |
| 4,889,015 | 12/1989 | Kondo | 364/424.1 X |
| 4,996,893 | 3/1991 | Nakamura et al. | 74/866 |
| 5,012,697 | 5/1991 | Yamashita et al. | 364/424.1 X |
| 5,019,979 | 5/1991 | Takahashi | 74/866 X |
| 5,022,285 | 6/1991 | Suzuki | 364/424.1 X |
| 5,047,934 | 9/1991 | Saito | 74/866 X |
| 5,089,963 | 2/1992 | Takahashi | 74/866 X |
| 5,123,301 | 6/1992 | Hägele et al. | 74/866 |
| 5,182,710 | 1/1993 | Tomisawa | 74/866 X |

FOREIGN PATENT DOCUMENTS

| | | |
|---|---|---|
| 51-22698 | 7/1976 | Japan . |
| 57-8983 | 2/1982 | Japan . |
| 63-53127 | 3/1988 | Japan . |
| WO90/00121 | 1/1990 | PCT Int'l Appl. . |

Primary Examiner—Leslie A. Braun
Assistant Examiner—David E. Henn
Attorney, Agent, or Firm—Keck, Mahin & Cate

[57] ABSTRACT

A shift control system for an automatic transmission has a multiple stage transmission gear mechanism provided with a plurality of shift gear stages of different speed ratios. A shift control device is provided with a plurality of shift patterns for controlling the multiple stage transmission gear mechanism and establishing one of the shift stages, based on a vehicle operating condition, in light of one of the shift patterns. A shift pattern switch device switches from one shift pattern to the other and back to the one shift pattern from the other when a value representing the vehicle operating condition changes beyond a reference value. A frequency detecting device detects when the frequency of change of the vehicle operating condition goes beyond a predetermined value, and a reference value change device changes the reference value based on the frequency of the change of the vehicle operating condition. The shift control can take into account the driving habits of a driver.

5 Claims, 6 Drawing Sheets

SHIFT CONTROL SYSTEM FOR AUTOMATIC TRANSMISSION

BACKGROUND OF THE INVENTION

1. Field of the Invention

This invention relates to a shift control system provided with a plurality of shift patterns for an automatic transmission of a vehicle.

2. Description of the Related Art

Conventionally, an automatic transmission of a vehicle is provided with a torque converter and a multi stage transmission gear mechanism connected with an output member of the torque converter. The transmission gear mechanism is provided with a plurality of shift gear stages of different speed ratios. A shift control unit is provided for making a shift operation to establish a proper shift stages automatically from among the plurality of shift gear stages in accordance with a vehicle operating condition.

The control unit is provided with a predetermined shift pattern for executing the shift operation between the plurality of the shift gear stages in accordance with vehicle speed and throttle opening, corresponding to the engine load, or throttle opening change speed, corresponding to the engine load change rate.

In a shift control provided with a single shift pattern, a shift operation, such as an up-shift operation or a down-shift operation, is made in light of the shift pattern when the vehicle speed and the engine load or the engine load change satisfies a predetermined relationship defined by the shift pattern.

It should be noted, however, that the vehicle operating condition is affected by road conditions, the personality of a driver and the like, as well as the shift pattern. As a result, in some cases, the shift operation is not properly made in response to an actual vehicle operating condition. In fact, the shift operation may be made contrary to the driver's desire.

In view of this, the shift control systems for automatic transmissions shown in Japanese Patent Publication Nos. 51-22698, published in 1976, and 57-8983, published in 1982 have been proposed. These publications disclose systems in which a plurality of shift patterns are provided for making shift operations so that one of the shift patterns is selected, for making a better shift operation, in accordance with a reference value of the engine load or the engine load change. In Japanese Patent Publication No. 51-22698, the shift pattern is switched in accordance with a throttle pedal stroke change speed corresponding to the engine load change rate. In Japanese Patent Publication No. 57-8983, the shift pattern is switched in accordance with the throttle opening or the engine load.

Generally, a conventional shift control system is provided with an economy mode shift pattern, in which the up-shift operation is made at a relatively low engine load to improve the fuel consumption efficiency, and a power mode shift pattern, in which the up-shift operation is made at a relatively high engine load to provide the vehicle with enough driving power.

However, the conventional shift control systems mentioned above execute the shift operation basically in accordance with the relationship between vehicle speed and engine load or engine load change so that the shift operation cannot be properly made in response to the driver's desire or when up-hill or winding roads and the like are present.

SUMMARY OF THE INVENTION

It is, therefore, a primary object of the invention to provide a shift control system for an automatic transmission in which a proper shift operation can be made, taking account of the road condition and the driver's driving habits.

Another object of the invention is to change the shift pattern, taking account of the shift operation intended by the driver, in the shift control system.

Still another object of the invention is to change a reference value for changing a shift pattern in accordance with the vehicle operating condition both when the shift pattern is changed from one to at least one other and when the shift pattern is returned to the one from the at least one other in a manner such that the driving habits of the driver is taken into account.

The above objects of the invention can be accomplished by the presently described shift control system for an automatic transmission, comprising a multiple stage transmission gear mechanism provided with a plurality of shift gear stages of different speed ratios. A shift control means is provided with a plurality of shift patterns for controlling the multiple stage transmission gear mechanism to establish one of the shift stages, based on a vehicle operating condition, in light of one of the shift patterns. Shift pattern switch means is provided for changing or switching the shift pattern from one such shift pattern to at least one other and back to the one shift pattern from the at least one other when the vehicle operating condition changes beyond a reference value. Frequency detecting means detects the frequency of change of the vehicle operating condition beyond a predetermined value, and reference value change means changes the reference value based on the frequency of the change of the vehicle operating condition.

The vehicle operating condition may be defined by a vehicle speed and an engine load. The frequency detecting means preferably detects a frequency of change of the engine load beyond a predetermined value. The reference value change means may change the reference value based on the frequency of the change of the engine load.

The shift control system is typically provided with an economy mode shift pattern, in which the shift operation is made at a relatively low vehicle speed and/or a relatively low engine load and a power economy mode shift pattern, in which the shift operation is made at a relatively high vehicle speed and/or a relatively high engine load.

The engine load can be determined by detecting a throttle opening, an accelerator pedal stroke, and the like.

In a preferred embodiment, the throttle opening changes are sorted into predetermined magnitude ranges and the number of changes in each magnitude range is totalized or added up to find the frequency of the engine load change. A maximum value of the frequency of change is multiplied by a unit value and compared with the reference value to determine if the shift pattern should be switched.

In order to determine the change in the vehicle operating condition, the engine load change speed or the throttle opening change speed rather than the engine load change can be used for switching the shift pattern.

In a preferred embodiment, the frequency detecting means detects the frequency at which the power mode is switched or changed to the economy mode. The reference value change means changes the reference value based on the switching frequency. In a case in which the power mode is selected for the shift operation, the shift control means returns the shift pattern from the power mode to the economy mode in accordance with the switching frequency and vice versa.

The above and other features of the present invention will be apparent from the detailed description of the preferred embodiments of the present invention and making reference to the accompanying drawings.

DESCRIPTION OF THE PREFERRED EMBODIMENTS

Figure 1:
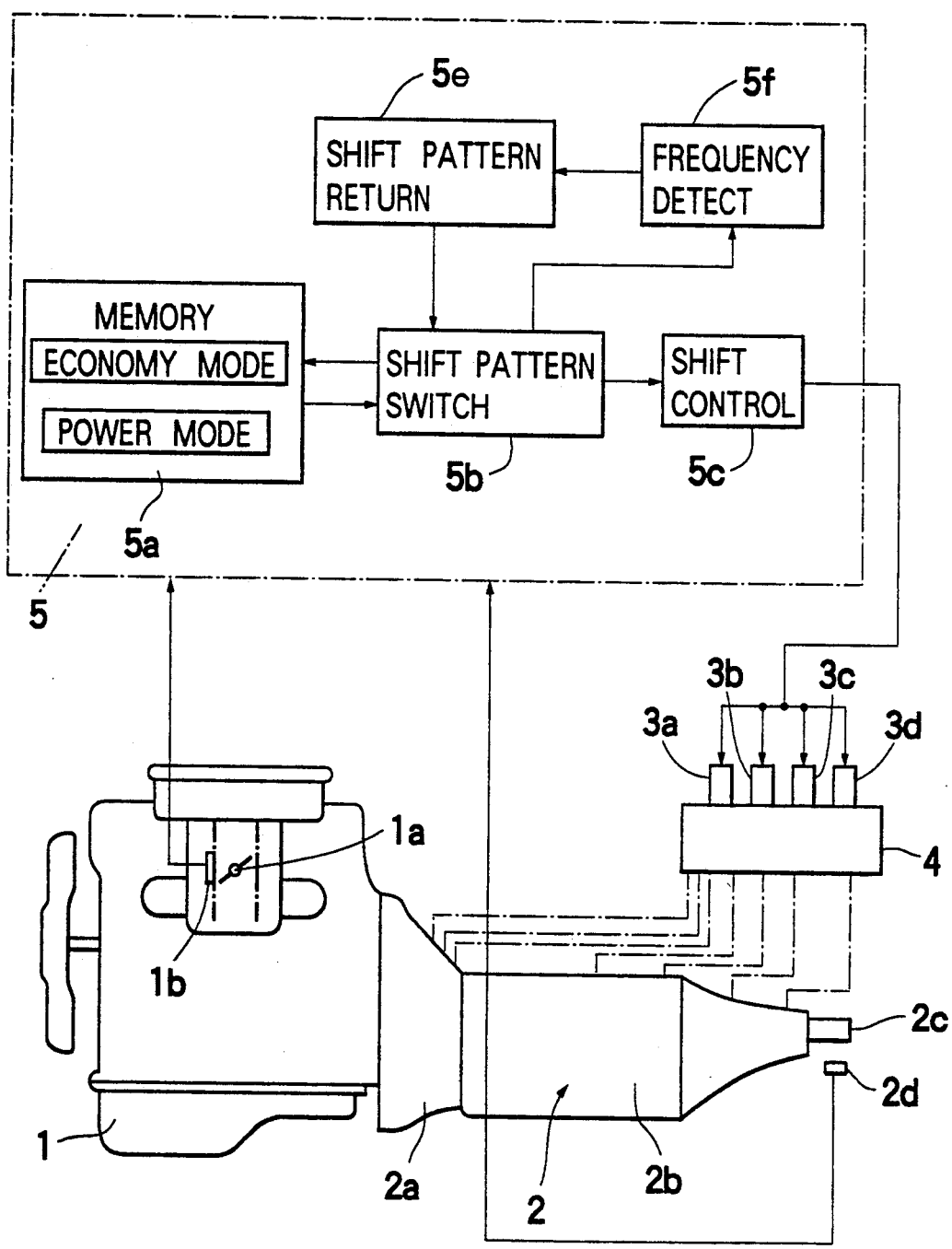
FIG. 1 is a schematic view of a shift control system for an automatic transmission in accordance with the present invention.

Referring to FIG. 1, there is shown an automatic transmission 2, connected with an engine 1, with which the present invention can be used.

The transmission 2 is provided with a torque converter 2a, connected with an output shaft of the engine 1, a multiple stage transmission gear mechanism 2b, having a plurality of shift gear stages of different speed ratios, connected with an output shaft of the torque converter 2a, and a shift control unit 5 for establishing one of the shift gear stages, which has a predetermined speed ratio, from among the plurality of shift gear stages by switching a power transmitting path of a hydraulic control circuit 4. Switching the power transmitting path selectively actuates a plurality of frictional elements in the transmission, and is done by means of solenoid valves 3a, 3b, 3c and 3d. The shift control unit 5 receives signals from a throttle sensor 1b for detecting an opening of a throttle valve 1a of the engine 1 and a vehicle speed detector 2d for detecting rotation speed of an output shaft 2c of the transmission 2 as a vehicle speed and produces a control signal in accordance with a vehicle operating condition. The shift control unit 5 is preferably constituted by a micro-computer having a memory 5a for storing a plurality of shift patterns prepared corresponding to the vehicle operating condition.

Figure 2A:
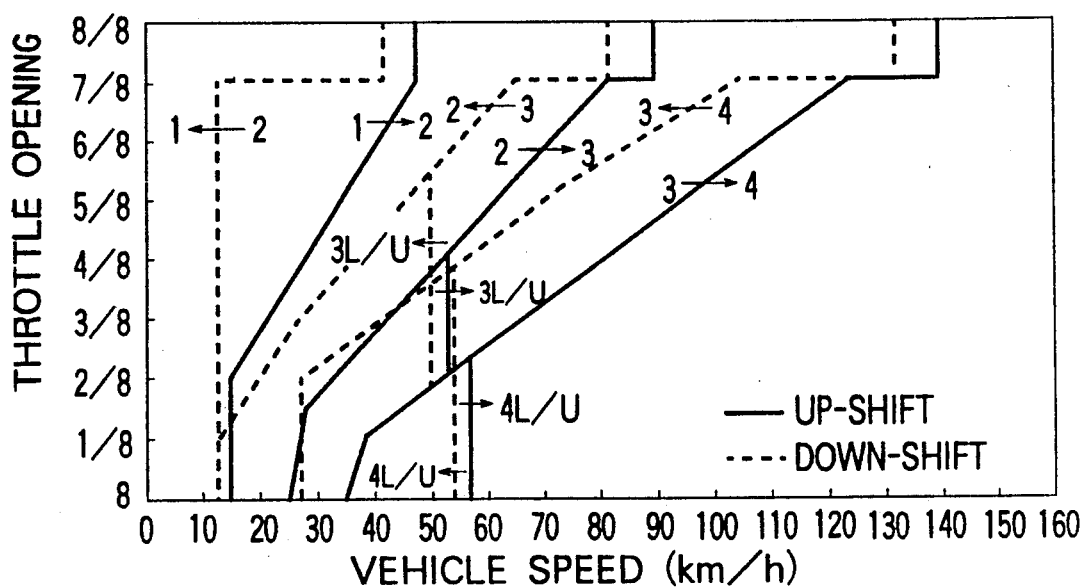
FIG. 2(a) is a graphical representation showing an economy mode shift pattern.
Figure 2B:
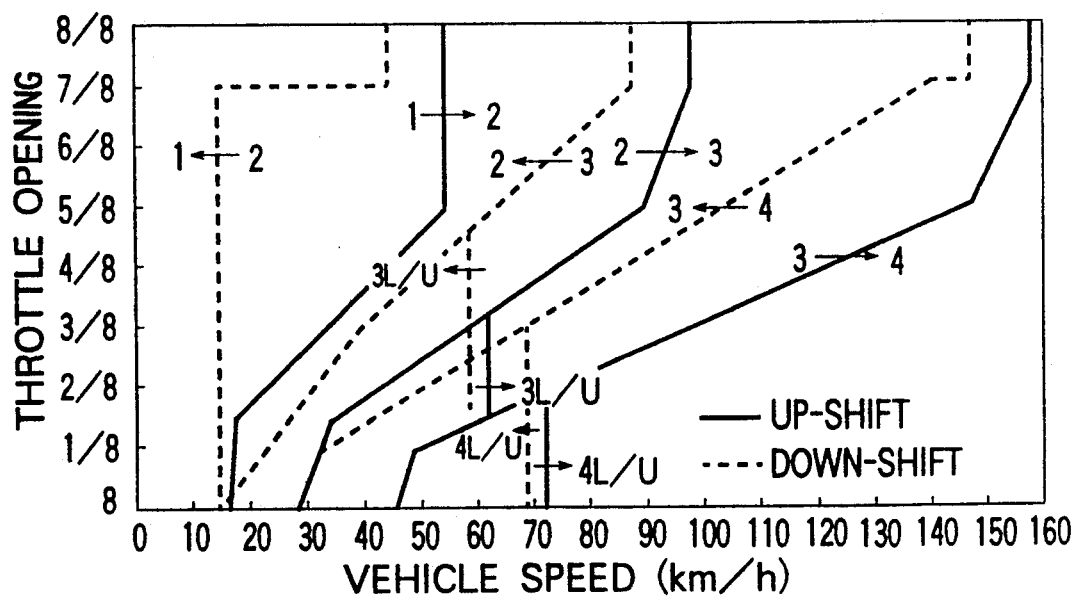
FIG. 2(b) is a graphical representation showing a power mode shift pattern.

The illustrated shift control unit 5 is provided with an economy mode shift pattern, in which a shift operation is made at a relatively low vehicle speed as shown in FIG. 2(a), and a power mode shift pattern, in which the shift operation is made at a relatively high vehicle speed as shown in FIG. 2(b). The economy mode and the power mode are stored in the memory 5a.

A frequency detecting section 5f is provided in the control unit 5 for sampling the throttle opening detected by the throttle sensor 1b at predetermined unit time intervals to calculate a throttle opening change, to sort the throttle opening change into a predetermined magnitude range and to totalize or add up the sorted throttle opening changes within a predetermined time period.

Figures 3, 4:
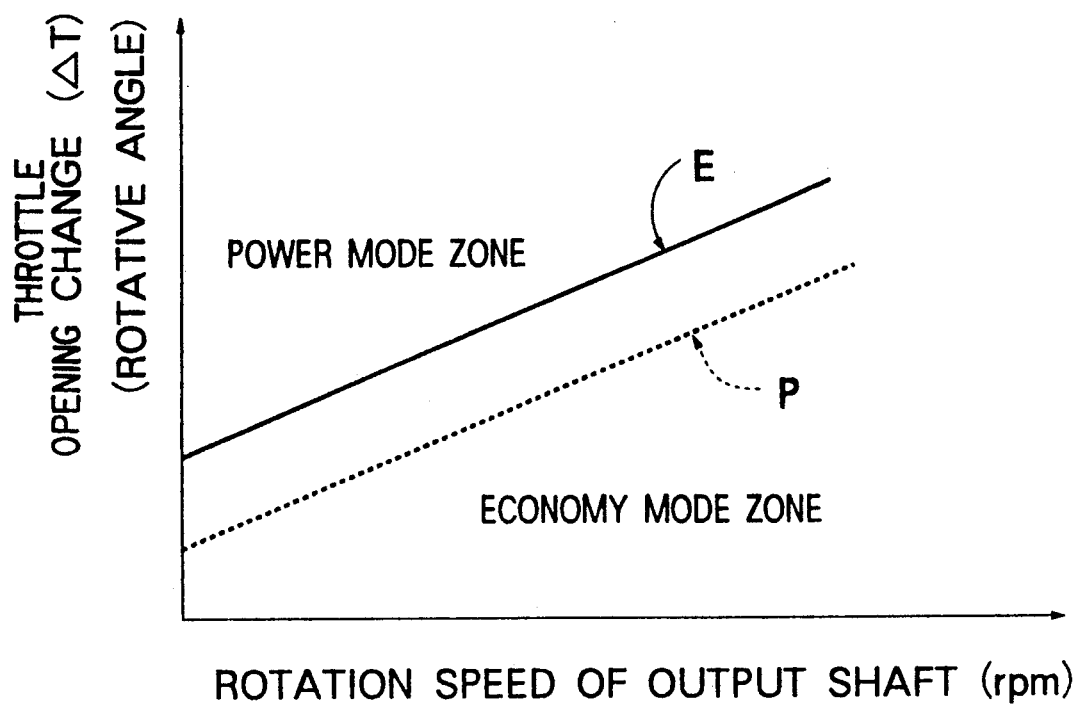
FIG. 3 is a graphical representation showing a map for switching the shift pattern.
FIG. 4 is a view showing a table of throttle opening changes.

A shift pattern switching section 5b is provided for comparing the throttle opening change belonging to the range occurring with the highest frequency with a predetermined reference value so as to determine whether or not the shift pattern should be switched between the economy mode and the power mode in light of a map as shown in FIG. 3.

In FIG. 3, an economy mode zone and a power mode zone are defined by a throttle opening change $\Delta T$ and the vehicle speed or a rotation speed of an output member of the transmission. Two different mode switching lines E and P are selectively employed for switching between the economy mode zone and the power mode zone in accordance with a vehicle operating condition. When the vehicle is in the power mode zone, which is defined as a zone above the switching lines E or P, the power mode as shown in FIG. 2(b) is used for shift operation. On the other hand, when the vehicle is in the economy mode zone, which is defined as a zone lower than the switching lines E or P, the economy mode as shown in FIG. 2(a) is used for the shift operation. Thus, the switching lines E and P function as reference lines for switching the shift pattern between the economy mode and the power mode.

Shift control section 5c is provided for switching the shift pattern between the economy mode and the power mode in accordance with the comparison in the shift pattern switching section 5b, if necessary, and for executing the shift operation in light of the shift pattern as shown in FIGS. 2(a) or 2(b).

The control unit 5 further comprises a resume control section 5e for determining a condition for resuming the shift control based on the economy mode in the case where the power mode is selected.

Figure 5:
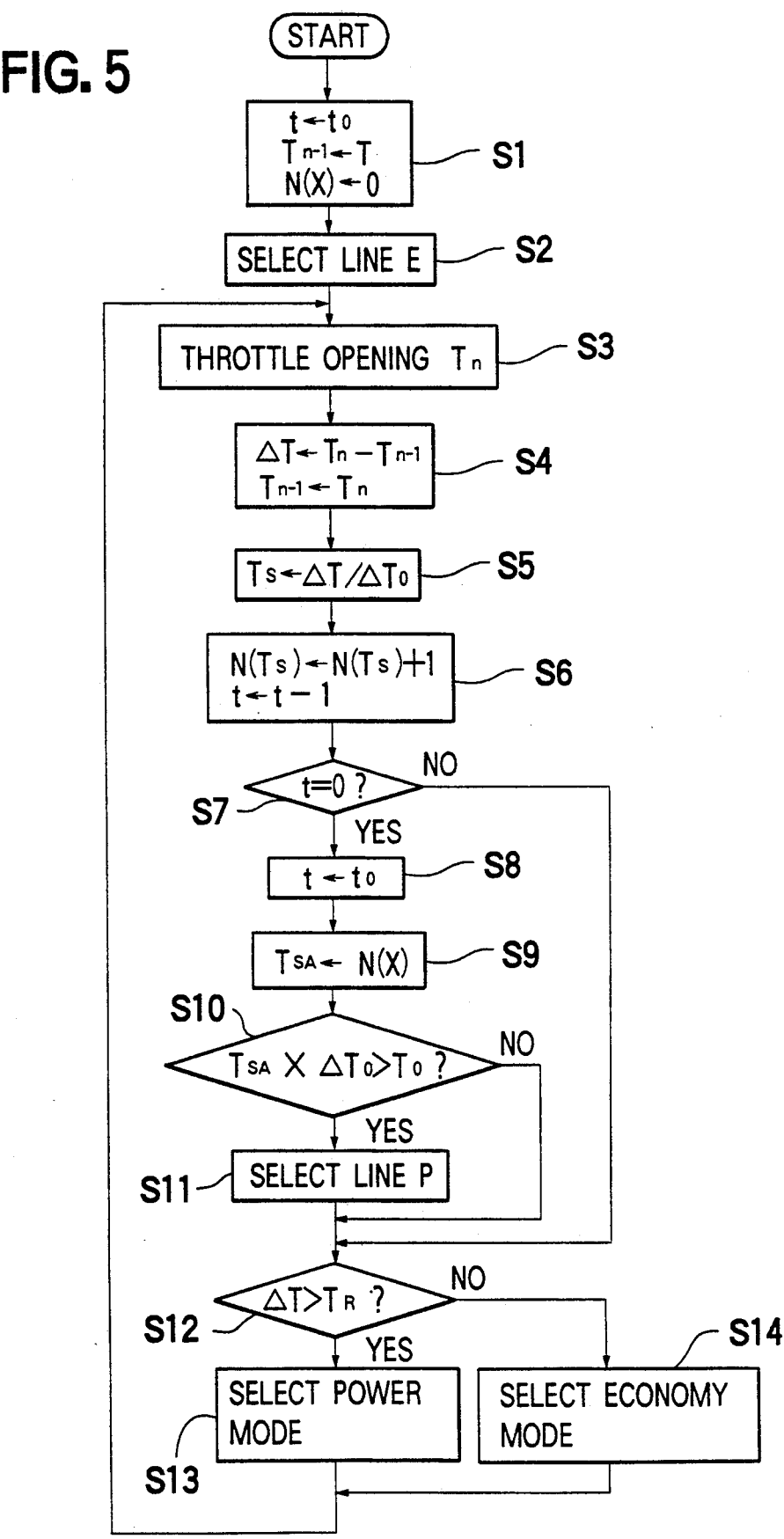
FIG. 5 is a flow chart of a shift control in accordance with a preferred embodiment of the present invention.

Hereinafter, a shift control by means of the illustrated control unit 5 is explained, making reference to a flow chart shown in FIG. 5.

The control unit 5 sets a timer t at $t_o$, reads the throttle opening T and stores a value representative of it in a storage or memory $T_{n-1}$ and clears each storage or memory $N(x)$ of a frequency table as shown in FIG. 4 for storing a frequency of throttle opening changes in each of a plurality of predetermined ranges of rotative angles of the throttle valve 1a (step S1).

Next, the control unit 5 initially selects the switching or reference line E for shift control (step S2). The control unit 5 reads the present throttle opening $T_n$ and calculates a difference $\Delta T = T_n - T_{n-1}$ between the previous throttle opening $T_{n-1}$ (in this embodiment, the time difference between throttle opening readings is 50 micro seconds) and the present throttle opening $T_n$ (steps S3 and S4). The difference $\Delta T$ corresponds to the throttle opening change in a time period of 50 micro seconds. Next, the control unit 5 divides the throttle opening change $\Delta T$ by a unit value $\Delta T_o$ (in this embodiment, the unit value $\Delta T_o$ is 5 degrees in rotative angle). Then the divided value $\Delta T/\Delta T_o$ is treated as an integral number $T_s$ (step S5).

This number is counted and sorted in the storage or memory $N(T_s)$ of the table shown in FIG. 4 in accordance with the magnitude of the integral number $T_s$. The above process from the steps S1 to S5 is repeated for the time period $t_o$, until the timer t is counted out (S7).

When the timer t is counted out, the control unit 5 resets the timer t at the value $t_o$ (step S8).

Next, the control unit 5 selects the maximum value $T_{SA}$ of the totalized, or added, and sorted values N(x) in accordance with the magnitude of the integral number $T_s$. The switching section 5b of the control unit 5 obtains a value $T_{SA} \times \Delta T_o$ and compares the value $T_{SA} \times \Delta T_o$ with a reference value $T_o$ (step S10). When the value $T_{SA} \times \Delta T_o$ is greater than the reference value $T_o$, the switching section 5b selects the switching line P in the map shown in FIG. 3 (step S11). Next, the switching section 5b compares the throttle opening change $\Delta T$ with a throttle opening reference value $T_R$ on a currently selected one of the lines E and P (step S12). It will be understood that the reference value $T_R$ changes as the vehicle speed changes. When the switching line E is selected, the reference value $T_R$ is greater than it is when the switching line P is selected. Thus, the reference value $T_R$ is changed in accordance with the vehicle operating condition. When the throttle opening change $\Delta T$ is greater than the reference value $T_R$, the shift control section selects the power mode for shift operation. On the other hand, when the throttle opening change $\Delta T$ is not greater than the reference value $T_R$, the economy mode is selected for shift operation. Accordingly, the reference value $T_R$ for switching the shift pattern is changed in accordance with the vehicle operating condition and, in particular, the frequency of the occurrence of the throttle opening change in the specific range. In the above shift control, when the vehicle runs on a winding road, an up-hill road or the like, the frequency of the throttle opening change in the specific range is high. In this case, the shift pattern can be easily changed to the power mode to improve drivability of the vehicle. On the other hand, when the frequency is not high, the economy mode is readily selected to provide good fuel consumption efficiency. When the throttle opening change $\Delta T$ reduces below the reference value $T_R$ when the power mode is selected, the switching section 5b selects the economy mode again; in other words, the control unit 5 resumes the shift control based on the economy mode. In this case, it will be understood that the reference value is changed in accordance with the vehicle operating condition as well (steps S10, S11, S12 and S14).

Since the frequency of the throttle opening change in the specific range is affected by the driver's driving habits, the above shift control can be made taking account of the driver's driving habits through the driver's operation of the throttle pedal.

The above shift control can also be made based on the throttle opening change speed.

Hereinafter, there is described another embodiment of the present invention, making reference to FIGS. 6 and 7.

Figure 6:
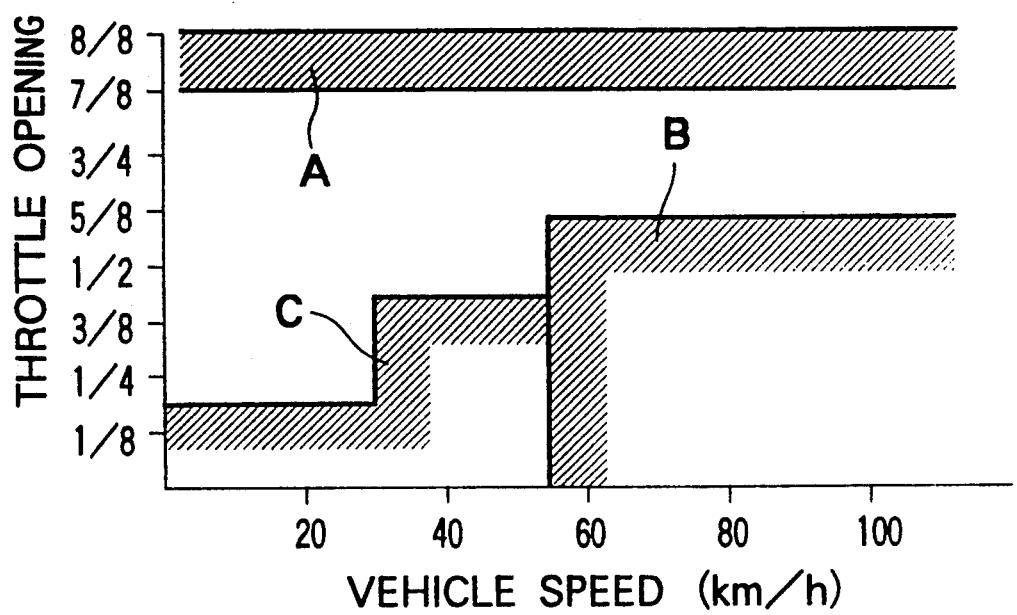
FIG. 6 is a view similar to FIG. 3 but according to another embodiment.

Referring to FIG. 6, there is shown a map for switching the shift pattern defined by the throttle opening and the vehicle speed.

A throttle opening greater than $\frac{7}{8}$ defines a zone A in which the power mode is selected for shift operation. A zone B is defined when the vehicle speed is greater than 55 km/h and the throttle opening is smaller than $\frac{5}{8}$. A zone C is defined when the vehicle speed is in a range from 30 km/h to 55 km/h and the throttle opening is smaller than $3.\frac{5}{8}$ and when the vehicle speed is smaller than 30 km/h and the throttle opening is smaller than $1.\frac{5}{8}$.

When the vehicle operating condition is in the zone A or when the throttle opening change speed is greater than a predetermined value, the shift pattern is switched from the economy mode to the power mode. When a time period of 0.65 second has passed after the vehicle operating condition is transferred to the zone B, the economy mode is selected again so that the control unit 5 resumes the shift control based on the economy mode. Otherwise, when a time period of 1.0 second has passed after the vehicle operating condition is transferred to the zone C, the control unit 5 resumes the shift control based on the economy mode. This condition for the resumption of the shift control based on the economy mode is considered as an original condition.

In this embodiment, the frequency detecting section detects a frequency of switching operation from the economy mode to the power mode in the switching section. When the switching operation occurs frequently from the economy mode to the power mode, the resume control section 5e of the control unit 5 changes the condition for resuming the shift control based on the economy mode. For example, when the frequency of the switching operation from the economy mode to the power mode is high, the resume control section 5e extends the time period of 0.65 second by 0.1 second in the case where the vehicle operating condition is transferred to the zone B and/or the resume control section 5e lowers the critical throttle opening $3.\frac{5}{8}$ defining the zone C by $\frac{1}{8}$ and extends the time period 1.0 second by 0.1 second. As a result, when the frequency of the switching operation from the economy mode to the power mode is high, the resumption of the shift control based on the economy mode is withheld to some extent for suppressing hunting.

Figure 7:
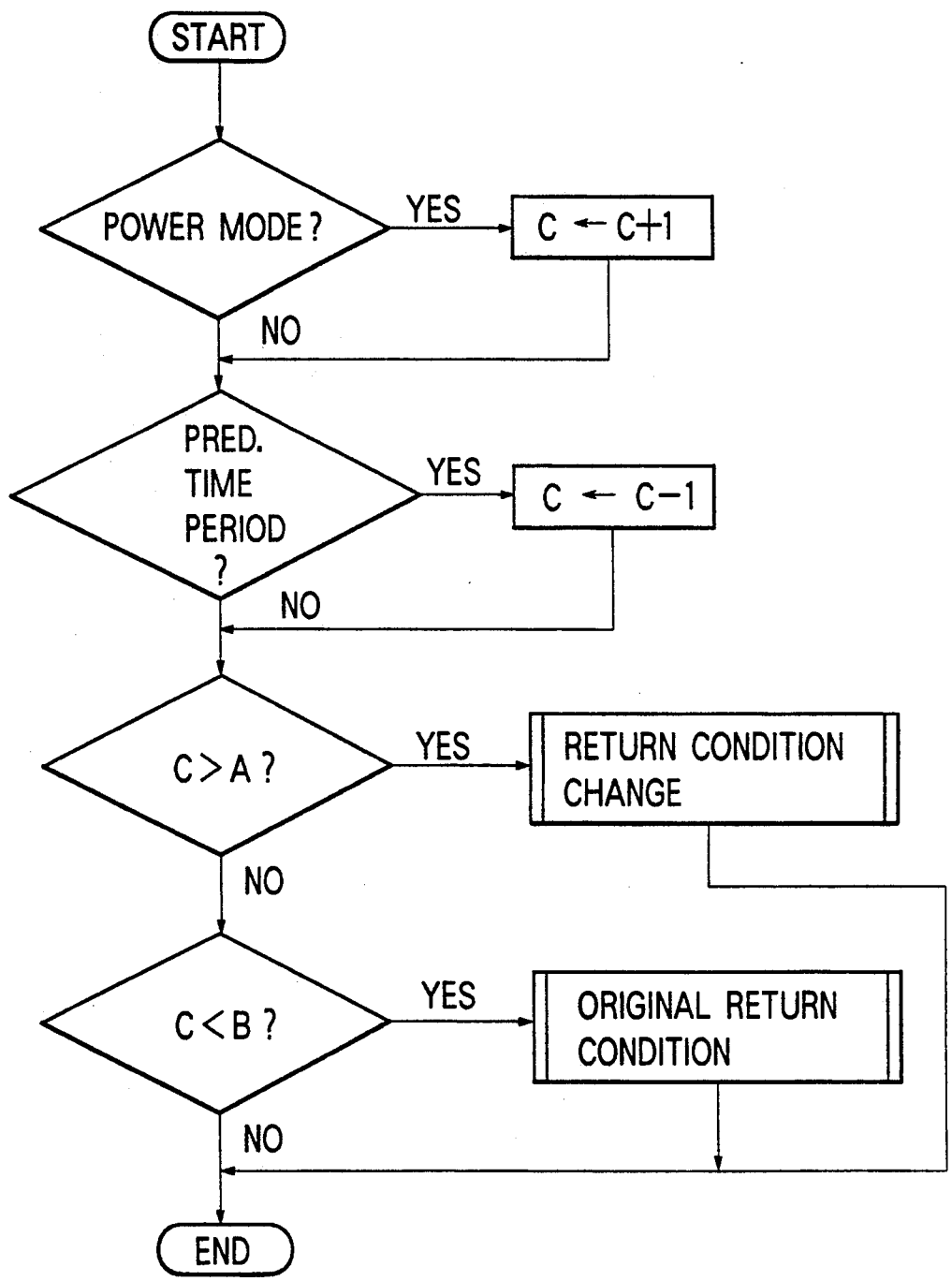
FIG. 7 is a flow chart of a shift control in accordance with the embodiment of the present invention shown in FIG. 6.

Referring to FIG. 7, there is shown a flow chart of the shift control in accordance with the illustrated embodiment.

Firstly, the control unit 5 judges whether or not the shift pattern is switched from the economy mode to the power mode. If the judgment is Yes, the control unit 5 increases a variable C 1. Next, the control unit 5 judges whether or not a predetermined time period has passed. If the judgment is Yes or the predetermined time period has passed without a switching operation from the economy mode to the power mode, the control unit 5 decreases the variable C by 1. Thereafter, the control unit 5 judges whether or not the variable C is greater than a predetermined value A. If the variable C is greater than a predetermined value A, the control unit 5 changes the condition for the resumption from the power mode to the economy mode to withhold the resumption.

Next, the control unit 5 judges whether or not the variable C is smaller than a predetermined value B. If the variable C is smaller than the predetermined value B, the control unit 5 returns the condition for the resumption of the shift control based on the economy mode where the condition has been changed previously. In this case, the control unit 5 may return the condition for the resumption gradually to the original condition. Alternatively, a part of the shift lines of the shift pattern can be changed to change the switching operation of the shaft pattern between the power mode and the economy mode.

According to the above shift control, the condition for the resumption to the economy mode is changed in accordance with the frequency of the switching operation of the shift pattern in a manner such that the power mode can be easily maintained under a vehicle operating condition in which the power mode is frequently selected. Thus, the above shift control can be made taking account of the driver's driving habits.

It will be apparent that various modifications and improvements can be made, based on the above description, by those skilled in the art without departing from the spirit of the present invention. All of such modifications are intended to be included in the scope of the present invention as claimed.

What is claimed is:

1. A shift control system for an automatic transmission in a vehicle comprising:
   a multiple stage transmission gear mechanism provided with a plurality of shift gear stages of different speed ratios,
   a hydraulic control circuit,
   means for detecting a vehicle speed and a throttle opening and generating control signals in accordance therewith, the vehicle speed and the throttle opening defining a vehicle operating condition,
   a memory for storing a plurality of shift patterns for controlling the hydraulic control circuit and used to establish one of the plurality of shift gear stages based on the vehicle operating condition and one of the shift patterns, and
   a shift control unit comprising means for receiving said control signals and means for selectively switching the shift pattern when the frequency of throttle opening changes exceeds a reference value determined by said vehicle operating condition and further representing one of first and second switching lines, said means for selectively switching the shift pattern comprising:
   means for obtaining a number, based on said control signals, representing a throttle opening change,
   a plurality of throttle opening change reference ranges stored in a memory,
   a plurality of memories for storing values representing the frequency of throttle opening change within respective ones of said reference ranges,
   means for determining into which range said number falls,
   means for incrementing a value in one of said plurality of memories corresponding to the range into which said number falls,
   means for selecting a maximum value from the values stored in said plurality of memories,
   means for selecting one of said first and second switching lines, based on the maximum value, to define the reference value,
   and means for switching said shift pattern based on the reference value.

2. A shift control system as recited in claim 1, wherein a current vehicle operating mode is one of an economy mode, in which shift operations between shift gear stages are made at relatively low vehicle speeds, and a power mode, in which shift operations are made at relatively high vehicle speeds.

3. A shift control system for an automatic transmission in a vehicle comprising:
   a multiple stage transmission gear mechanism provided with a plurality of shift gear stages of different speed ratios,
   a hydraulic control circuit,
   means for detecting a vehicle speed and a throttle opening and generating control signals in accordance therewith, the vehicle speed and the throttle opening defining a vehicle operating condition,
   a memory for storing a plurality of shift patterns for controlling the hydraulic control circuit and used to establish one of the plurality of shift gear stages based on the vehicle operating condition and one of the shift patterns, and a shift control unit comprising:
   means for receiving said control signals,
   means for determining whether a current shift pattern is a shift pattern corresponding to operation of the vehicle in an economy mode or a power mode,
   means for counting the number of times a change from the economy mode to the power mode occurs,
   means for decreasing said number if a reference time period, determined by said vehicle operating condition, has passed without a change from the economy mode to the power mode,
   means for judging whether said number is greater than a first predetermined value corresponding to a need for said power mode,
   means for establishing operation of the vehicle in the power mode if said number is greater than said first predetermined value,
   means for judging whether said number is smaller than a second predetermined value corresponding to a need for said economy mode,
   and means for establishing operation of the vehicle in said economy mode if said number is smaller than said second predetermined value.

4. A shift control system as recited in claim 3, wherein the shift control unit delays placing the current vehicle operating condition in the economy mode for a predetermined time period.

5. A shift control system as recited in claim 4 wherein the reference time period is increased as the number is increased.

* * * * *